A. F. MÜLLER.
CAROUSEL.
APPLICATION FILED JAN. 9, 1912.
1,040,736.
Patented Oct. 8, 1912.
4 SHEETS—SHEET 1.
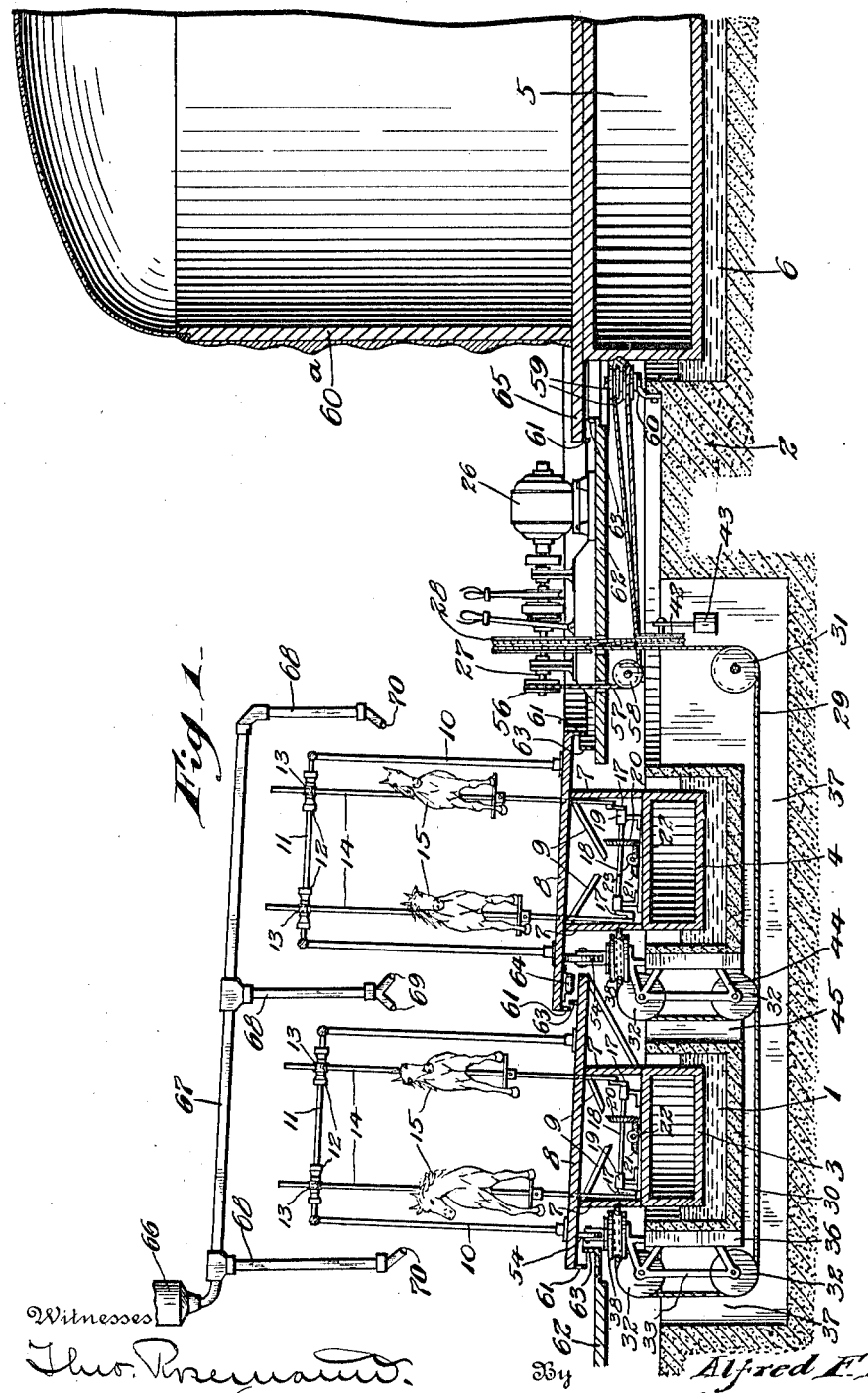

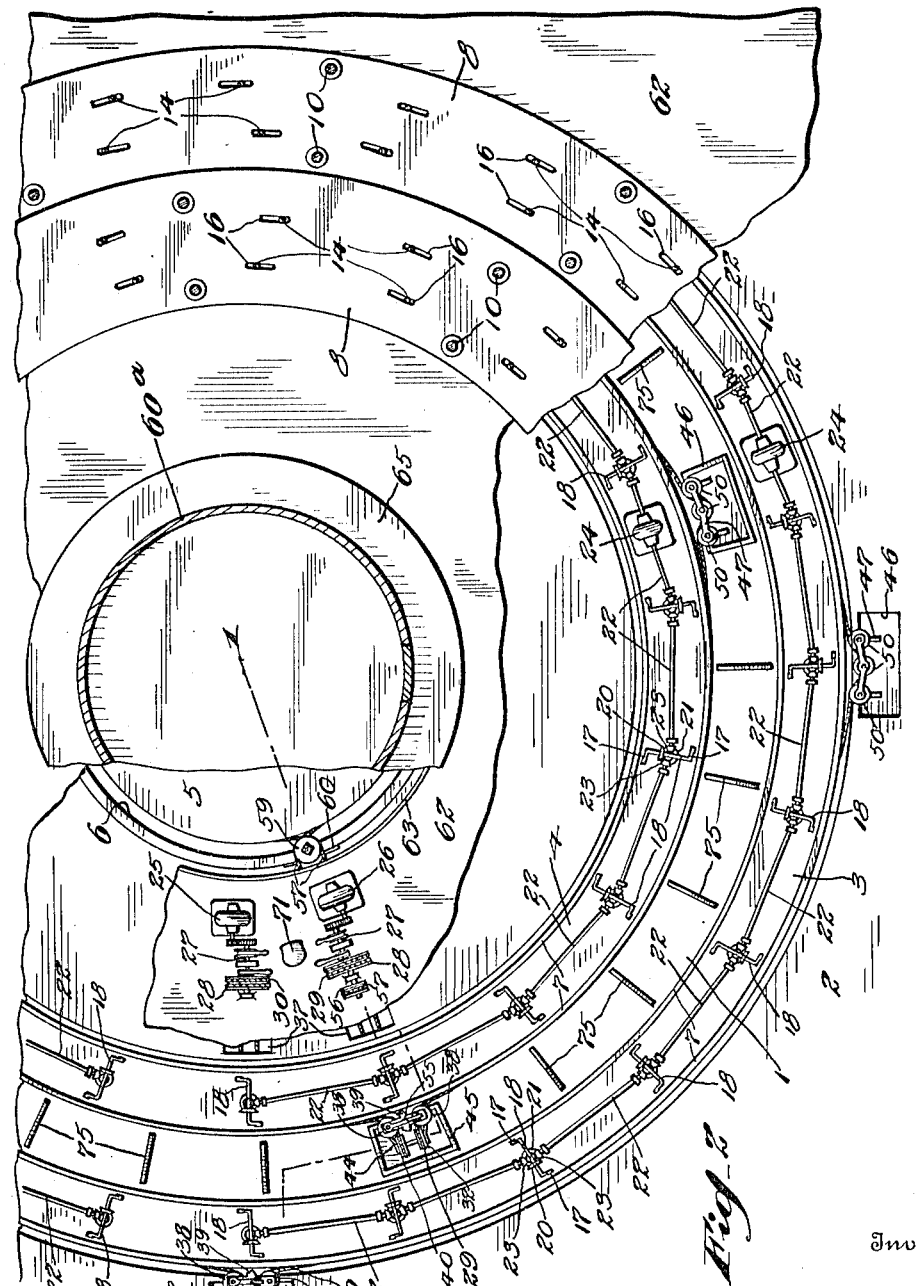

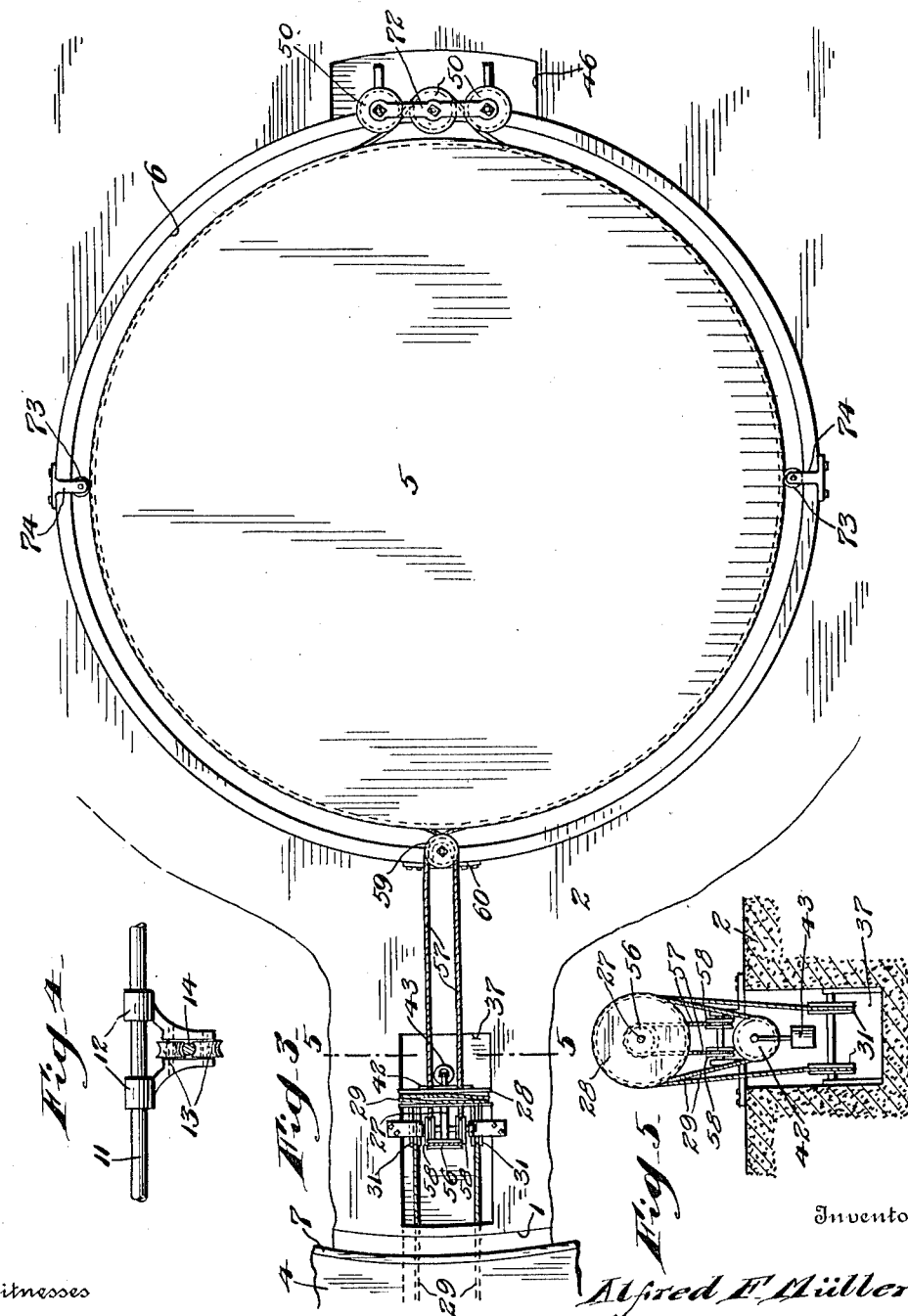

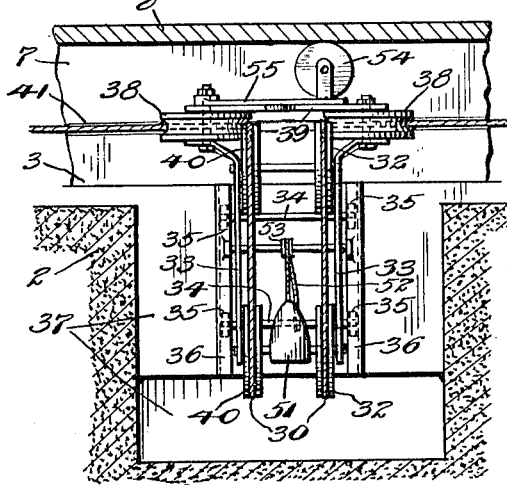
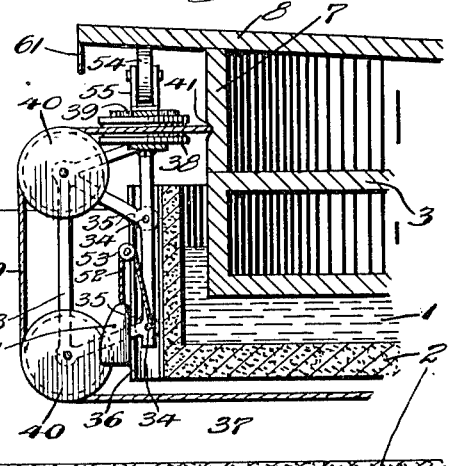
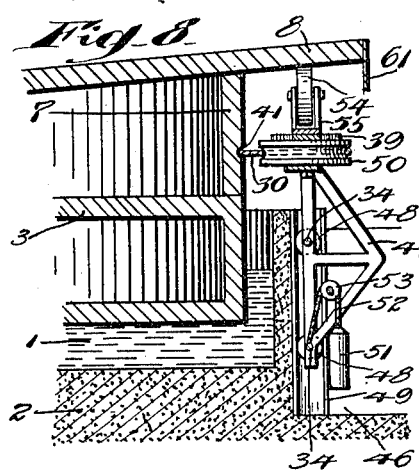
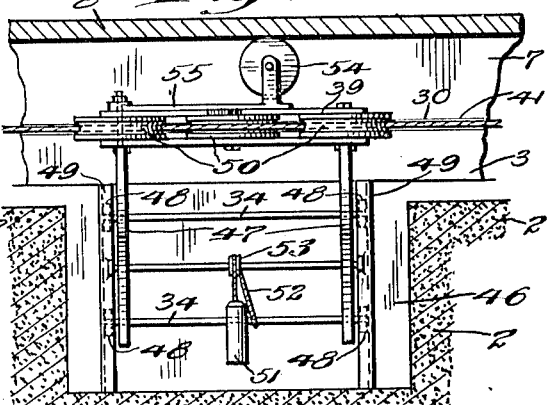
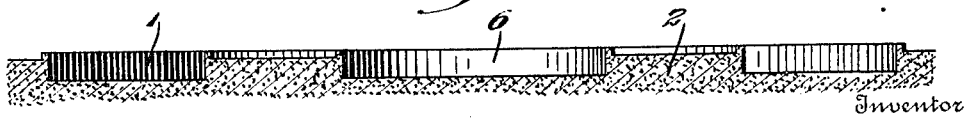

UNITED STATES PATENT OFFICE.

ALFRED F. MÜLLER, OF PHILADELPHIA, PENNSYLVANIA.

CAROUSEL.

1,040,736.  Specification of Letters Patent.  Patented Oct. 8, 1912.

Application filed January 9, 1912.  Serial No. 670,157.

*To all whom it may concern:*

Be it known that I, ALFRED F. MÜLLER, a citizen of the United States, residing at Philadelphia, in the county of Philadelphia and State of Pennsylvania, have invented certain new and useful Improvements in Carousels, of which the following is a specification.

My invention relates to improvements in carousels, an object of the invention being to provide one or more circular pontoons or floats containing figures, preferably horses, and provide improved means for moving the pontoons and the figures.

A further object is to provide a plurality of circular pontoons floating in water contained in a suitable tank, each pontoon containing figures preferably horses, and provide independent means for moving the pontoons so that the horses on one pontoon will have the appearance of racing with the horses on the other pontoon, and provide improved means for imparting to the horses a galloping motion as the pontoons are moved.

A further object is to provide a carousel in which the figures or horses are supported in circular series on movable pontoons, said pontoons driven by improved mechanism, whereby they may be operated at different speeds under the convenient control of a single operator, and provide centrally in the carousel, a rotary float containing scenery adapted to be moved in a direction opposite to the direction of the pontoons, whereby the effect is had of an increased speed.

With these and other objects in view, the invention consists in certain novel features of construction and combinations and arrangements of parts, as will be more fully hereinafter described and pointed out in the claims.

In the accompanying drawings: Figure 1, is a view in vertical section showing approximately one half of the apparatus, said section taken upon a radial line from the center on the line 1—1 of Fig. 2. Fig. 2, is a sectional plan view broken away to show different elevations. Fig. 3, is a plan view illustrating the center float, and its operating means. Fig. 4, is a plan view on an enlarged scale illustrating one of the brackets 12. Fig. 5, is a view in section on the line 5—5 of Fig. 3. Figs. 6, and 7, are views on an enlarged scale at right angles to each other, illustrating the carriage 33, its mounting and the parts carried thereby. Figs. 8, and 9, are views at right angles to each other illustrating the carriage 47, its mounting, and the parts carried thereby, and Fig. 10, is a view in longitudinal section on a reduced scale showing the cement formation to provide the necessary water tanks or compartments.

1, represents a circular tank, which is formed in a bed 2 of cement or concrete, and in this tank 1, two circular pontoons 3 and 4 respectively are located. This tank is to contain water up to the desired level, so that the pontoons float upon the water, and the inner pontoon 4 is of appreciably less diameter than the outer pontoon, and they are maintained in concentric relation to each other, and with a central circular float 5, which is mounted in a water tank 6 formed centrally in the cement or concrete bed 2.

Both pontoons 3 and 4 have vertical upwardly projecting supporting walls 7, which constitute upward extensions of the pontoon, and these walls support the floors 8, and are strengthened by diagonal braces 9. On the floors 8 of both pontoons 3, and 4, and regularly spaced apart, are circular series of rectangular frames 10. On the upper cross bar 11 of each frame 10, two rearwardly projecting brackets 12 are secured, and support two rollers 13. These rollers 13 have concaved peripheries, so that they are adapted to receive between them a vertically movable rod 14 on which the figure 15, preferably the figure of a horse, is secured.

For convenience of description, the figure 15 will be hereinafter referred to as a horse, but I would have it understood that this invention, while it is particularly adapted for the employment of figures representing horses, is not limited to any particular style of figure, and in the employment of this term, I use it in the broad sense to cover any figure which might be so employed.

The rods 14 extend through slots 16 in the floors 8, and are secured at their lower ends to crank arms 17 on shafts 18 mounted transversely of the pontoon, and supported on the top of the pontoon in suitable brackets 19. The shafts 18 are each provided with beveled gears 20, which mesh with horizontally disposed beveled gears 21 on the pontoons, and these beveled gears 21 are driven by longitudinally positioned shafts 22 having beveled pinions 23 at their ends. Attention is called particularly to Fig. 2, in which it will be seen that the several shafts 18 are all connected by gearing and shafting such as above explained, and at some point in the line of longitudinal shafting, a motor 24 is provided.

With a large carousel, it is advisable to employ at least two motors on each pontoon, one motor driving one half of the mechanism on the pontoon, and attention is also called to the arrangement of gears on the several shafts 18. In other words, these gears are so arranged that the horses do not move forwardly in unison, but they are moved forward alternately, so as to give a more perfect representation of the natural galloping movement of horses in a race. To propel the pontoons, I provide motors 25 and 26 respectively. These motors drive shafts 27, the speed of which are suitably reduced by the necessary gearing, and on these shafts power transmitting drums 28 are fixed. Drum 28, on the shaft of motor 26, drives a cable 29, which is adapted to turn the inner pontoon forward, while the drum 28 of the other motor shaft, drives a cable 30 to turn the larger pontoon 3. As these driving mechanisms are precisely alike, the description hereinafter of one will apply alike to both, and hence I will use to indicate both structures the same reference characters. The cable 30 from its driving drum 28 passes downwardly and around a pulley (not shown) but corresponding in position to the pulley 31 for cable 29 illustrated in Fig. 1. This cable 30, then extends upwardly over pulleys 32 supported in one side of a vertically movable carriage 33. The frame of this carriage is provided with shafts 34 on which rollers 35 are mounted, and move in vertically positioned channel guides 36 secured to the tank 1. When I say that these channels are secured to the tank 1, I mean that they are secured to the concrete structure 2, and of course the latter is made with a suitable conduit 37 to accommodate the parts above described.

The carriage 33 supports at its upper end, two horizontally positioned pulleys 38, the journals of which are connected by a transverse bar 39, and said frame is also provided with two vertically positioned pulleys 40 parallel with the pulleys 32. In other words, the carriage 33 has four vertically positioned pulleys and two horizontally positioned pulleys, and the cable 30 after passing up around pulleys 32, passes around one horizontal pulley 38, and thence around the pontoon, and is preferably located in a groove 41 in the outer wall 7 of said pontoon. This cable passes over suitable pulleys arranged at regular intervals as will be hereinafter described in its passage around the pontoon, and it then extends around the other horizontal pulley 38, down over the pulleys 40, thence under a pulley corresponding to pulley 31, thence once around drum 28, thence down under an idle pulley 42, thence again over drum 28, and downward to the first mentioned pulley corresponding to the pulley 31. Pulley 42 is provided with a weight 43 which is designed to take up the slack in the cable 30. The operating mechanism for the inner smaller pontoon 4 is precisely like that above described for the outer larger pontoon, and the same reference characters are used to indicate similar parts.

The carriage 44 for the inner pontoon is mounted in a box or opening 45 formed in the cement or concrete foundation. At regular intervals, around the pontoons, and supported in suitable boxes or openings 46, are carriages 47. These carriages are provided with rollers 48 which move in channel guides 49 fixed to the foundations, and said carriages each support three pulleys 50. The cable passes against the inner face of the end pulleys, and around the outer face of the intermediate pulley, and these pulleys and their carriages supporting the same serve to prevent any appreciable lateral movement of the pontoons holding them in their proper position in the tanks, yet allowing them free longitudinal movement as they turn.

The carriages 33, 44, and 47, are all held in their upward position by means of weights 51 connected by cords 52 with the carriages, and passed over pulleys 53 so that the downward pull of the weight serves to move the carriages upwardly, such upward movement being limited by rollers 54. The rollers 54 are supported in bifurcated ends of arms 55, the latter pivotally supported at one end as shown, so that the arm is free to swing. This movement is permitted the arm because the floor or platform 8 may have a slight lateral movement, and this movement of the arm prevents the rollers 54 from lateral scraping movement. In other words, the rollers do not rub on the floor, but the arm swings. On the shaft 27 of motor 26, a pulley 56 is secured and drives a cable 57. This cable 57 passes under pulleys 58, and in opposite directions around horizontally positioned pulleys 59 on a support 60 secured outside of the tank 6. The cable 57, in other words, passes in opposite directions from the pulley 59 around the float 5, so that this float is revolved in a direction opposite to the direction of movement of the pontoons.

The cable 57 which passes around the float 5 is provided at a point opposite the pulleys 59 with a carriage 72 precisely like the carriage 47 above described, and has at opposite sides, midway between pulleys 59 and carriage 72, pulleys 73 which are mounted in brackets 74 fixed to the tank 6, so that the float 5 is maintained in a central position in the tank. On this float 5, any suitable ornamental structure 60ª is secured, and preferably represents scenery, which may or may not give the further impression of a race track. The outer platform 8 has a depending flange 61 at its outer edge, and the fixed platform 62 has an upwardly projecting flange 63 inside of the flange 61, so that a person's foot or an article could not pass under the platform. To limit the downward movement of the inner platform, so that by no possibility could a person's foot be mashed, rollers 64 are mounted on the under face of the inner platform, and are adapted to roll against the outer platform in the event of an excessive weight on one side. The inner and outer platform, where they overlap, are also provided with flanges 61 and 63, as is the inner edge of the inner platform, and the edge of the platform 65 of float 5. These flanges prevent any possibility of injury, because the outer flanges 61 are preferably of some flexible material, while the inner or upwardly projecting flanges 63 are of some fixed or substantial material.

It will be noted that with my improvements, there are four circular series of horses, and to allow the riders on all of these horses to grasp the ordinary rings, a hopper 66 is provided, and is constructed with a main outlet passage 67 connected to downwardly projecting passages 68. The intermediate passage 68 has two outlets 69, while the other passages 68 have single outlets 70. An operator's seat 71 is located in convenient reach of the controlling mechanism of the motors 25 and 26, so that the operator may control the speed of both of the pontoons 3, and 4, so that the horses on one pontoon will pass the horses on the other, and thus add interest to the apparatus. The purpose is to give the impression of a horse race, and the horses have a galloping motion, and move at different speeds, so that the riders pass each other. By providing the pontoons, all roller supports for the platforms are dispensed with, as the buoyancy of the pontoons in the water affords all necessary support, and permits them to be moved with the expenditure of a minimum of power, because they are endless, and friction is reduced to a minimum.

To prevent any splashing of the water due to the rotary motion imparted to the pontoons, a circular series of bulk heads 75 are provided in the tank 1, between the pontoons, and these bulk heads serve to check the motion of the water, and prevent the formation of waves.

It will be noted that with my improved apparatus, all heavy timbers are dispensed with, because the weight of the pontoons and the riders is supported on the water, and not from a central point as is common with apparatus of this type in general use. With my improvements therefore, a wide latitude in design and unlimited size is permitted. With the girder construction, a limit is soon reached as to the diameter of the apparatus on account of the strains and stresses upon the beams. With my apparatus, the pontoons may be of any diameter, and the roof and other structure (not illustrated), may be absolutely separate from the mechanism above explained.

Various slight changes might be made in the general form and arrangements of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A carousel comprising an annular concealed water containing tank, and a circular pontoon supported solely by the water in the tank, substantially as described.

2. A carousel comprising an annular concealed water containing tank, a circular pontoon supported solely by the water in the tank, and means for turning the pontoon, substantially as described.

3. A carousel comprising a tank containing water, a circular pontoon mounted in the tank and supported solely by the water in the tank, figures on the pontoon, and means for turning the pontoon, substantially as described.

4. A carousel comprising a tank adapted to contain water, a circular pontoon mounted in the tank, figures supported on the pontoon, means for moving the pontoon, and means for moving the figures, substantially as described.

5. A carousel comprising a circular pontoon, means for moving the same, a central scenic float, and means for turning the float in a direction opposite to the movement of the pontoon, substantially as described.

6. A carousel comprising a water containing tank, a circular pontoon mounted in the tank, means for moving the pontoon, a central scenic float, and means for turning the float in a direction opposite to the movement of the pontoon, substantially as described.

7. A carousel comprising a circular concealed tank adapted to contain water, a circular pontoon supported on the water in the tank, means for moving the pontoon, a central scenic device, and means for turning the scenic device, substantially as described.

8. A carousel comprising a tank adapted to contain water, a circular pontoon mounted in the tank, figures supported on the pontoon, means for moving the pontoon, means for moving the figures, a central scenic float, and means for turning the float in a direction opposite to the movement of the pontoon, substantially as described.

9. A carousel comprising an annular concealed tank having water therein, and a plurality of concentric circular pontoons supported solely by the water in the tank, substantially as described.

10. A carousel comprising an annular concealed tank containing water, and a plurality of circular concentric pontoons mounted in the tank and supported solely by the water in the tank, and means for moving said pontoons at different relative speeds, substantially as described.

11. A carousel comprising an annular concealed tank containing water, and a plurality of circular concentric pontoons mounted in the tank and supported solely by the water, a motor for each pontoon, and cables driven by the motors and extending around the pontoons, whereby said pontoons may be driven independently and at different speeds, substantially as described.

12. A carousel comprising a tank adapted to contain water, and a plurality of circular concentric pontoons mounted in the tank, a motor for each pontoon, and cables driven by the motors and extending around the pontoon, whereby said pontoons may be driven at different speeds, vertically movable carriages supported on the tanks, pulleys on said carriages around which said cables are passed, and weights normally holding said carriages in elevated position, substantially as described.

13. A carousel comprising a tank adapted to contain water, and a plurality of circular concentric pontoons mounted in the tank, a motor for each pontoon, and cables driven by the motors and extending around the pontoon, whereby said pontoons may be driven at different speeds, vertically movable carriages supported on the tanks, pulleys on said carriages around which said cables are passed, weights normally holding said carriages in elevated position, pivotally mounted horizontally disposed arms on said carriages, rollers on said arms, and platforms on the pontoons engaging said rollers, substantially as described.

14. A carousel comprising a tank adapted to contain water, and a plurality of circular concentric pontoons mounted in the tank, a motor for each pontoon, and cables driven by the motors and extending around the pontoon, whereby said pontoons may be driven at different speeds, vertically movable carriages supported on the tanks, pulleys on said carriages around which said cables are passed, weights normally holding said carriages in elevated position, pivotally mounted horizontally disposed arms on said carriages, rollers on said arms, platforms on the pontoons engaging said rollers, said platforms overlapping each other, and rollers on the upper platform adapted to engage the lower platform, substantially as described.

15. A carousel comprising a plurality of concentric circular pontoons, frames on said pontoons, brackets on said frames, rods movable through said brackets, crank shafts moving said rods, means for turning said crank shafts, and figures secured on said rods, substantially as described.

16. A carousel comprising a tank adapted to contain water, and a plurality of circular concentric pontoons mounted in the tank, means for moving said pontoons at different relative speeds, frames on said pontoons, brackets on said frames, rods movable through said brackets, crank shafts moving said rods, means for turning said crank shafts, and figures secured on said rods, substantially as described.

17. A carousel comprising a tank adapted to contain water, and a plurality of circular concentric pontoons mounted in the tank, a motor for each pontoon, and cables driven by the motors and extending around the pontoon, whereby said pontoons may be driven at different speeds, frames on said pontoons, brackets on said frames, rods movable through said brackets, crank shafts moving said rods, means for turning said crank shafts, and figures secured on said rods, substantially as described.

18. A carousel comprising a tank adapted to contain water, and a plurality of circular concentric pontoons mounted in the tank, a motor for each pontoon, and cables driven by the motors and extending around the pontoon, whereby said pontoons may be driven at different speeds, vertically movable carriages supported on the tanks, pulleys on said carriages around which said cables are passed, weights normally holding said carriages in elevated position, frames on said pontoons, brackets on said frames, rods movable through said brackets, crank shafts moving said rods, means for turning said crank shafts, and figures secured on said rods, substantially as described.

19. A carousel comprising a tank adapted to contain water, and a plurality of circular concentric pontoons mounted in the tank, a motor for each pontoon, and cables driven by the motors and extending around the pontoon, whereby said pontoons may be driven at different speeds, vertically movable carriages supported on the tanks, pulleys on said carriages around which said cables are passed, weights normally holding said carriages in elevated position, pivotally mounted horizontally disposed arms on said carriages, rollers on said arms, platforms on the pontoons engaging said rollers, frames on said pontoons, brackets on said frames, rods movable through said brackets, crank shafts moving said rods, means for turning said crank shafts, and figures secured on said rods, substantially as described.

20. A carousel comprising a tank adapted to contain water, and a plurality of circular concentric pontoons mounted in the tank, a motor for each pontoon, and cables driven by the motors and extending around the pontoon, whereby said pontoons may be driven at different speeds, vertically movable carriages supported on the tanks, pulleys on said carriages around which said cables are passed, weights normally holding said carriages in elevated position, pivotally mounted horizontally disposed arms on said carriages, rollers on said arms, platforms on the pontoons engaging said rollers, said platforms overlapping each other, rollers on the upper platform adapted to engage the lower platform, frames on said pontoons, brackets on said frames, rods movable through said brackets, crank shafts moving said rods, means for turning said crank shafts, and figures secured on said rods, substantially as described.

In testimony whereof I have signed my name to this specification in the presence of two subscribing witnesses.

ALFRED F. MÜLLER.

Witnesses:
R. H. KRENKEL,
CHARLES E. POTTS.

---

Copies of this patent may be obtained for five cents each, by addressing the "Commissioner of Patents, Washington, D. C."